(12) United States Patent
Marston et al.

(10) Patent No.: US 9,187,588 B2
(45) Date of Patent: Nov. 17, 2015

(54) ELUTION OF METAL IONS FROM CHELATING RESIN USING AMINO ACID ELUANT

(71) Applicants: Dow Global Technologies LLC, Midland, MI (US); Rohm and Haas Company, Philadelphia, PA (US); Stephen M. Smith, Midland, MI (US)

(72) Inventors: Charles R. Marston, Midland, MI (US); Stephen M. Smith, Midland, MI (US); Matthew L. Rodgers, Midland, MI (US); Karen S. Eastman, Shepherd, MI (US)

(73) Assignees: Dow Global Technologies LLC, Midland, MI (US); Rohm and Haas Company, Philadelphia, PA (US)

(*) Notice: Subject to any disclaimer, the term of this patent is extended or adjusted under 35 U.S.C. 154(b) by 0 days.

(21) Appl. No.: 14/414,815

(22) PCT Filed: Aug. 13, 2013

(86) PCT No.: PCT/US2013/054605
§ 371 (c)(1),
(2) Date: Jan. 14, 2015

(87) PCT Pub. No.: WO2014/031382
PCT Pub. Date: Feb. 27, 2014

(65) Prior Publication Data
US 2015/0175728 A1    Jun. 25, 2015

Related U.S. Application Data

(60) Provisional application No. 61/757,364, filed on Jan. 28, 2013, provisional application No. 61/691,336, filed on Aug. 21, 2012.

(51) Int. Cl.
| | |
|---|---|
| *C08G 6/00* | (2006.01) |
| *C08F 212/36* | (2006.01) |
| *B01J 45/00* | (2006.01) |
| *B01J 49/00* | (2006.01) |
| *C22B 3/42* | (2006.01) |
| *B01D 15/38* | (2006.01) |
| *C08F 212/08* | (2006.01) |

(52) U.S. Cl.
CPC .......... *C08F 212/36* (2013.01); *B01D 15/3828* (2013.01); *B01J 45/00* (2013.01); *B01J 49/0065* (2013.01); *C08F 212/08* (2013.01); *C22B 3/42* (2013.01)

(58) Field of Classification Search
CPC ..................................... C08F 6/02; C08C 1/14
USPC ........................................................ 528/486
See application file for complete search history.

(56) References Cited

U.S. PATENT DOCUMENTS

| | | |
|---|---|---|
| 3,998,924 A | 12/1976 | Jones et al. |
| 4,031,038 A | 6/1977 | Grinstead et al. |
| 4,098,867 A | 7/1978 | Grinstead et al. |
| 4,451,375 A | 5/1984 | Grinstead |
| 4,564,644 A | 1/1986 | Harris |
| 4,568,700 A | 2/1986 | Warshawsky et al. |
| 4,666,683 A | 5/1987 | Brown et al. |
| 4,895,905 A | 1/1990 | Schneider et al. |
| 5,102,640 A | 4/1992 | Schlapfer |
| 5,112,837 A | 5/1992 | Burrows et al. |
| 5,141,965 A | 8/1992 | Pike |
| 5,182,026 A | 1/1993 | Pike |
| 5,231,115 A | 7/1993 | Harris |
| 5,723,098 A | 3/1998 | Salzburg et al. |
| 6,924,317 B2 | 8/2005 | Feistel et al. |
| 2004/0256597 A1 | 12/2004 | Barrrett et al. |

FOREIGN PATENT DOCUMENTS

WO    9749492    12/1997

OTHER PUBLICATIONS

Ewing W et al: "The effect of plating additives on the recovery of copper from dilute aqueous solutions using chelating resins", Confrence Info: Hydrometallurgy 2003: Proceedings of the 5th International Symposium Honoring Professor Ian M. Ritchie. Aug. 24, 2003, pp. 753-762.

Fiona M Doyle et al: "2003 Progress Report: Electrolysis and Ion Exchange for the In Process Recycling of Copper from Semi-Conductor Processing Solutions EPA Grant No. R829627", Oct. 1, 2006, pp. 1-2.

*Primary Examiner* — Terressa Boykin
(74) *Attorney, Agent, or Firm* — Edward W. Black

(57) ABSTRACT

A method of eluting metal ions from a bed of metal-loaded chelating resin wherein the resin includes a crosslinked styrene-divinylbenzene copolymer matrix with pendent methyleneaminopyridine or phosphonic acid groups and the method includes the step of passing an eluant through the bed to at least partially remove the metal ions from the chelating resin and create a metal-rich eluate, wherein the eluant includes an aqueous solution comprising an amino acid compound having a molecular weight less than 500 Daltons.

9 Claims, 2 Drawing Sheets

ELUTION OF METAL IONS FROM CHELATING RESIN USING AMINO ACID ELUANT

FIELD

The invention relates to the elution of metal ions from chelating exchange resins.

INTRODUCTION

Chelating exchange resins based upon crosslinked styrene-divinylbenzene copolymer matrixes including pendent methyleneaminopyridine or phosphonic acid groups have been used in the recovery of metals (e.g. copper, nickel, chromium, cobalt, iron, etc.). U.S. Pat. Nos. 3,998,924, 4,031,038, 4,098,867, 4,451,375, 5,112,837, 5,141,965 and 5,182,026 each describe examples of chelating exchange resins including methyleneaminopyridine functional groups comprising picolylamine moieties such as: 2-picolylamine, bis-(2-picolylamine), N-(2-hydroxyethyl)-2-picolylamine, N-(2-hydroxypropyl)-2-picolylamine, N-methyl-2-picolylamine and N-(2-methylaminoethyl)-2-picolylamine. U.S. Pat. Nos. 4,895,905, 5,231,115 and 4,564,644 describes macroporous and gel-type crosslinked styrene-divinylbenzene copolymer matrixes comprising an interpenetrating polymer network with methyleneaminopyridine functional groups comprising 2-picolylamine moieties. U.S. Pat. No. 5,723,098 describes the use of chelating resins including aminophosphonic acid groups in the recovery of iron ions from an acid eluate.

Metal loaded on such chelating resins is commonly removed by elution with a strong mineral acid or ammonia. Traditional eluants can create environmental challenges and interfere with subsequent electro-winning operations.

SUMMARY

The invention includes a system and method that at least partially addresses the shortcomings noted above. In one embodiment, the invention includes a method of eluting metal ions from a bed of metal-loaded chelating resin wherein the resin includes a crosslinked styrene-divinylbenzene copolymer matrix with pendent methyleneaminopyridine or phosphonic acid groups and the method includes the step of passing an eluant through the bed to at least partially remove the metal ions from the chelating resin and create a metal-rich eluate, wherein the eluant includes an aqueous solution comprising an amino acid compound having a molecular weight less than 500 Daltons.

In another embodiment, the invention includes a system and method for recovering metals from a product liquor solution through chelation and electro-winning including the steps of: (a) passing a product liquor solution which contains metal ions through the bed of resin which is selective for loading the metal ions, (b) passing the eluant through the bed to at least partially remove the metal ions from the chelating resin and create a metal-rich eluate, and (c) electro-winning the metal-rich eluate to produce electro-won metal and a metal-depleted eluate. At least a portion of the metal-depleted eluate may be optionally combined with product liquid solution and steps (a), (b) and (c) may be repeated. Many additional embodiments are described.

DETAILED DESCRIPTION

Figure 1:
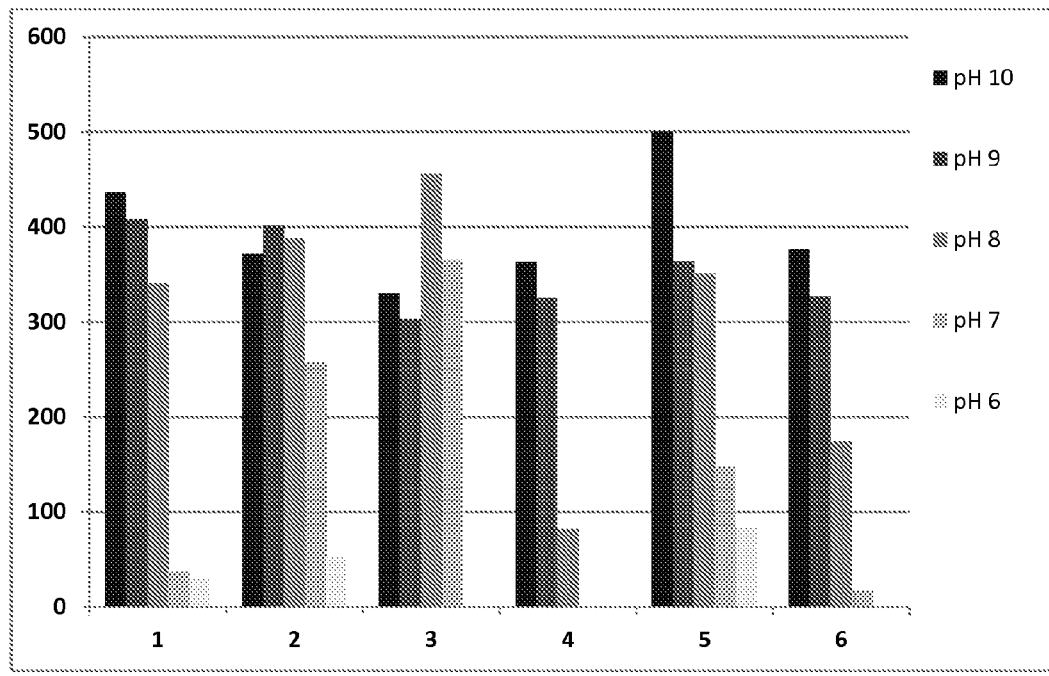
FIG. 1 is a bar graph showing total copper elution using various eluants at different pH values, as further described in Example 1.

In one set of embodiments, the invention includes a system and method for eluting metals from a chelating resin. In another set of embodiments, the invention includes a system and method for recovering metals from a product liquor solution through chelation and electro-winning The term "product liquor solution," sometimes also referred to as "pregnant leach solution" or "pregnant liquor solution" is abbreviated herein as "PLS." The source of the PLS is not particularly limited but is typically produced by heap leaching, vat leaching or pressure leaching ores. The PLS includes an acidic, aqueous solution including one or more metals, (e.g. copper, nickel, cobalt, chromium, cadmium, iron, uranium, zinc, silver, gold, mercury, platinum, vanadium and molybdenum). The PLS typically has a pH of less than 4, but more commonly less than 3.

In general, PLS is passed through a bed of the chelating exchange resin selective for loading the metal ions of interest (e.g. copper, nickel). Metal ions are subsequently liberated from the resin by passing an eluant through the bed to at least partially remove the metal ions from the resin and create a metal-rich eluate. This metal-rich eluate may then be subject to electro-winning to produce electro-won metal and a metal-depleted eluate. The metal-depleted eluate may be recycled and combined with PLS for subsequent treatment as part of a continuous or batch process. In another embodiment, PLS passing through the first bed (or beds) of chelating exchange resin passes through a second bed which removes lower value metals such as iron which may otherwise interfere with electrowinning. The PLS may then be recycled or reused.

The eluate comprises an aqueous solution comprising an amino acid compound having a molecular weight less than 500 Daltons, and more preferably less than 300 Daltons. The pH of the eluate is preferably at least 7, more preferably at least 8, still more preferably at least 9, and in some embodiments at least 10. The concentration of amino acid compound in the eluate is preferably between 0.1 and 3 molar, more preferably between 0.2 and 2 molar, and still more preferably between 0.3 and 1.5 molar. In one embodiment, the amino acid compound includes one or more amino acid functional groups as represented by Formula I.

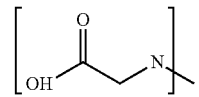

Formula (I)

In another set of preferred embodiments, the amino acid compound is represented by Formula II.

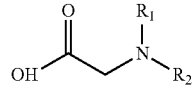

Formula (II)

wherein $R_1$ and $R_2$ are independently selected from: hydrogen and an alkyl group having from 1 to 6 carbon atoms which may be unsubstituted or substituted with at least one of: amine, amino acid, carboxylic acid, hydroxyl, thiol and a ring structure (e.g. aryl (e.g. phenyl, naphthyl, thienyl, indolyl), heterocyclic (e.g. nitrogen, oxygen or sulfur containing 5 or 6-membered rings), or $R_1$ and $R_2$ may collectively form such a ring structure.

In another embodiment, the amino acid compound is selected from at least one of: alanine, arginine, asparagine, aspartic acid, cysteine, glutamic acid, glutamine, glycine, histidine, isoleucine, leucine, lysine, methionine, ornithine, phenylalanine, proline, selenocysteine, serine, taurine, threonine, tryptophan, tyrosine and valine.

In another embodiment, the amino acid compound is selected from at least one of: iminodiacetic acid and ethylenediaminetetraacetic acid.

In another embodiment, the eluant contains no mineral acids or ammonia.

Applicable chelating exchange resins preferably include a water insoluble, macroporous, crosslinked, copolymer matrix with a plurality of pendant methyleneaminopyridine or phosphonic acid groups. In preferred embodiments, the pendant groups are capable of chelating with various metals including one or more of: copper, nickel, cobalt, chromium, cadmium, iron, uranium, zinc, silver, gold, mercury, platinum, vanadium and molybdenum. In one embodiment, the methyleneaminopyridine group comprises a picolylamine moiety linked to the crosslinked copolymer matrix by a methylene group. Representative examples of preferred picolylamine moieties include: 2-picolylamine, bis-(2-picolylamine), N-(2-hydroxyethyl)-2-picolylamine, N-(2-hydroxypropyl)-2-picolylamine, N-methyl-2-picolylamine, and N-(2-methylaminoethyl)-2-picolylamine. Representative commercial resins include DOWEX™ M4195 and XUS-43578 brand chelating exchange resins available from The Dow Chemical Company. These commercial resins are based upon a macroporous crosslinked styrene-divinylbenzene copolymer matrix with methyleneaminopyridine functional groups comprising bis-(2-picolylamine) moieties. By way of illustration, a repeating unit of a styrenic copolymer matrix is provided below including a representative example of a preferred methyleneaminopyridine group represented by Formula III.

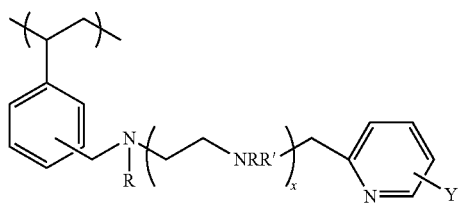

Formula (III)

wherein:
x is 0, 1 or 2 (preferably 0);
Y is H or a $C_1$-$C_4$ alkyl group (preferably H);
R' is H or $CH_3$; and
R is H, $C_1$-$C_4$ alkyl group, $C_2$-$C_4$ hydroxyl alkyl group, $C_2$-$C_4$ aminoalkyl group, or a 2-picoylamine moiety as represented by Formula IV:

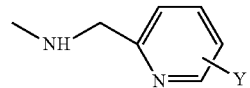

Formula (IV)

Representative methyleneaminopyridine groups and methods for functionalizing crosslinked copolymer matrixes therewith are described in detail in U.S. Pat. Nos. 3,998,924; 4,031,038; 4,098,867; 4,451,375; 5,112,837; 5,141,965 and 5,182,026—the entire content of which are collectively incorporated herein by reference.

Representative phosphonic acid resins include AMBERLITE™ IRC747 and Purolite S957. By way of illustration, a repeating unit of a styrenic copolymer matrix is provided below including a representative example of a preferred phosphonic acid group represented by Formula V.

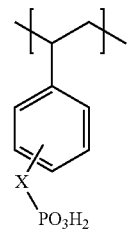

Formula V wherein X is selected from an alkyl or aminoalkyl group including from 1 to 3 carbon atoms. The aromatic ring may be optionally substituted with a sulfonic group as represented by Formula VI.

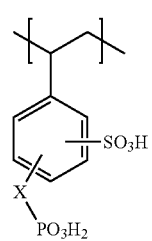

Formula VI

The repeating unit including a preferred aminophosphonic group is represented by Formula VII.

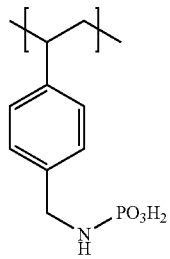

Formula VII

Crosslinked copolymer matrixes preferably have a bead structure with a median particle diameter from 300 to 800 microns. The crosslinked copolymer particles may have a Gaussian particle size distribution but preferably have a relatively uniform particle size distribution, i.e. "monodisperse" that is, at least 90 volume percent of the beads have a particle diameter from about 0.9 to about 1.1 times the volume average particle diameter. While preferably provided in bead form, the subject copolymer particles may also be provided in other forms including a film, membrane, fiber, chip or other physical form.

Chelating exchange resins may be prepared by reacting a haloalkylated form of the aforementioned crosslinked copolymer matrix with an aminopyridine. Preferred aminopyridines include 2-picolylamine, bis-(2-picolylamine), N-(2-hydroxyethyl)-2-picolylamine, N-(2-hydroxypropyl)-2-picolylamine, N-methyl-2-picolylamine, and N-(2-methylaminoethyl)-2-picolylamine. Such picolylamines may be prepared, for example by hydrogenation of 2-cyanopyridine or by reaction of 2-picolyl chloride with an appropriate amine or alkylenepolyamine such as methylamine, monoethanolamine, ethylenediamine, propylenediamine, etc.

While a wide variety of known haloalkylation techniques may be used, chloromethylation is preferred. The specific means and conditions for chloromethylating are not particularly limited and many applicable techniques are documented in the literature. Chloromethylation is typically conducted by combining the copolymer with a chloromethylation reagent in the presence of a catalyst at a temperature of from about 15 to 100° C., preferably 35 to 70° C. for about 1 to 8 hours. A preferred chloromethylation reagent is chloromethyl methyl ether (CMME); however, other reagents may be used including CMME-forming reactants such as the combination of formaldehyde, methanol and hydrogen chloride or chlorosulfonic acid (as described in US 2004/0256597), or hydrogen chloride with methylated formalin. The chloromethylating reagent is typically combined with the copolymer in an amount of from about 0.5 to 20, preferably about 1.5 to 8 mole of CMME per mole of copolymer. While less preferred, other chloromethylation reagents may be used including but not limited to: bis-chloromethyl ether (BCME), BCME-forming reactants such as formaldehyde and hydrogen chloride, and long chain alkyl chloromethyl ethers as described in U.S. Pat. No. 4,568,700. Catalyst useful for conducting chloromethylation reactions are well known and are often referred to in the art as "Lewis acid" or "Friedel-Crafts" catalyst. Nonlimiting examples include: zinc chloride, zinc oxide, ferric chloride, ferric oxide, tin chloride, tin oxide, titanium chloride, zirconium chloride, aluminum chloride and sulfuric acid along with combinations thereof. Halogens other than chloride may also be used in the preceding examples. A preferred catalyst is ferric chloride. The catalyst is typically used in an amount corresponding to about 0.01 to 0.2, preferably from about 0.02 to 0.1 mole catalysts per mole of copolymer repeating unit. Catalyst may be used in combination with optional catalyst adjuncts such as calcium chloride and activating agents such as silicon tetrachloride. More than one catalyst may be used to achieve the desired chloromethylation reaction profile. Solvents and/or swelling agents may also be used in the chloromethylation reaction. Examples of suitable solvents including but are not limited to one or more of: an aliphatic hydrocarbon halides such as ethylene dichloride, dichloropropane, dichloromethane, chloroform, diethyl ether, dipropyl ether, dibutyl ether and diisoamyl ether. When CMME is used as the chloromethylation agent, such solvents and/or swelling agents are often not necessary.

Once haloalkylated, the copolymer may be aminated via conventional processes such as described in US 2004/0256597; U.S. Pat. Nos. 4,564,644 or 6,924,317—the entire contents of which are incorporated herein by reference. Amination may be performed by combining the haloalkylated resin (preferably pre-washed) with an amine solution, (preferably at a ratio of approximately of about 1.25 to 4.0 mole of amine per mole of benzylhalide group) at an elevated temperature (e.g. typically from 25-150° C., but more preferably from 40-85° C.) for several hours (e.g. typically for 2 to 10 hours). After which, the resulting solution may be cooled and the aminated resin decanted, washed and optionally treated in dilute hydrochloric acid at elevated temperature (e.g. 50-90° C.). The amine solution may comprise a slurry solvent of water and optionally an inorganic salt such as sodium chloride; and may optionally include a swelling agent such as methylal.

In one embodiment, the copolymer matrix is reacted with CMME and the resulting chloromethylated copolymer is washed and subsequently combining with the aminopyridine species in a ratio of from about 3 mole amine per mole of benzyl chloride group of the copolymer, within an 10% sodium chloride/water solution. The reaction mixture may be agitated for about 4 to 10 hours and maintained at a temperature of about 65 to 85° C. and a pH of about 8.5 to 12 for the majority of the reaction time period. The pH of the reaction mixture can be maintained by periodic addition of base, such as sodium hydroxide, sodium carbonate, calcium hydroxide, calcium oxide or potassium hydroxide. In the case of sparingly soluble bases (e.g. calcium hydroxide) or weaker bases (e.g. sodium carbonate), the pH of the reaction mixture may be maintained by the addition of all or a majority of the base at the beginning of the amination. In order to improve conversion and avoid copolymer bead breakage, the pH of the reaction mixture should be monitored and pH excursions outside of the designated range should be minimized.

EXAMPLES

Example 1

Single Stage Copper Elution Test: (Bottle Shake Testing):

One liter of DOWEX M-4195 resin was hydrated for 1 hour using deionized water. The resin was loaded into columns and rinsed at a slow drip with 200 g/L sulfuric acid until color was no longer present. The columns were then rinsed with 20 bed volumes of deionized water (slow drip) and unloaded into a 1 liter NALGENE™ container. A 200 g portion of the preconditioned DOWEX M-4195 resin was then contacted with 10 bed volumes of a 60 g/L copper sulfate solution at pH 2 in a glass column at a rate of 5 bed volumes per hour (5 BV/h). The resulting copper loaded resin was used in all subsequent "bottle shake" testing using various eluants: (1) glycine, (2) L(+)-lysine, (3) ethylenediaminetetraacetic acid, (4) L-glutamic acid, (5) iminodiacetic acid, and (6) ammonium sulfate (as a comparison).

The copper loaded resin was centrifuged. The top layer of resin was scrapped off and discarded. Multiple 0.5 g aliquots of the centrifuged resin were placed into 120 mL NALGENE bottles, along with 50 mL eluant solution. The mixtures were shaken at room temperature for 3 hours, after which the pH was adjusted with solid sodium hydroxide, and then shaken overnight at 50° C. For each eluant, samples mixtures were tested at pH values of 6, 7, 8, 9 and 10. The samples were allowed to settle and the decantate was analyzed by x-ray florescence spectroscopy (XRF) for copper content. Results are provided in FIG. 1.

Example 2

Column Elution Testing

Figure 2:
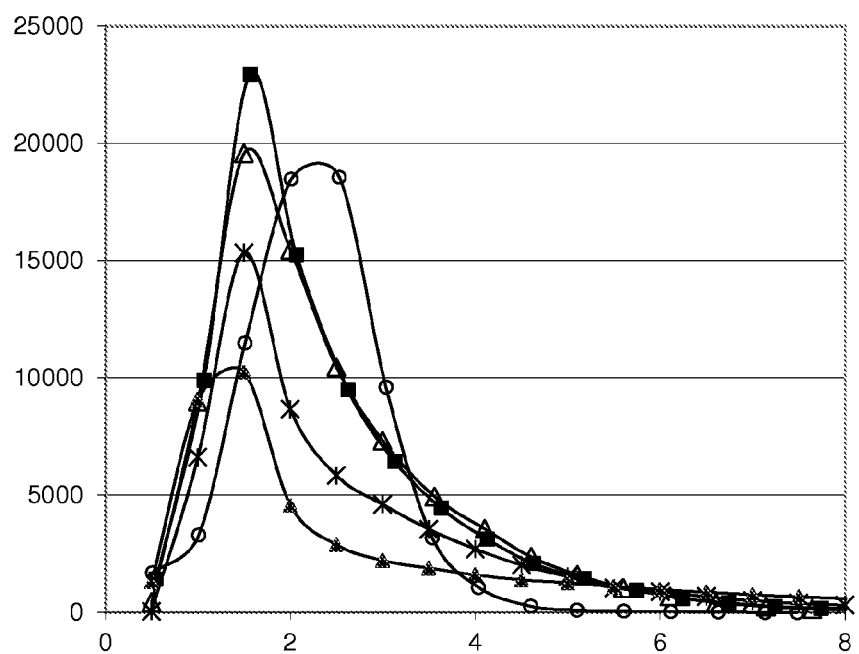
FIG. 2 is a graph of copper elution curves using various eluants, as further described in Example 2.

One liter of DOWEX M-4195 resin was hydrated for 1 hour using deionized water. The resin was loaded into columns and rinsed at a slow drip with 200 g/L sulfuric acid until color was no longer present. The columns were rinsed with 20 bed volumes of deionized water (slow drip) and unloaded into a 1 liter NALGENE™ container. A 200 g portion of the preconditioned DOWEX M-4195 resin was then contacted with 10 bed volumes of a 60 g/L copper sulfate solution at pH 2 in a glass column at a rate of 5 BV/h. 20 mL each of copper loaded DOWEX M-4195 resin was loaded into multiple 1 cm diameter glass ion exchange columns. Elution solutions were passed through the columns at 60° C. at the same rates. Samples are collected in 10 ml aliquots and analyzed by XRF for copper content. Results are provided in FIG. 2 as a plot of copper (ppm) vs. bed volumes of eluant. The eluants included:

1) 1 molar solution of L(+)-lysine designated with open triangles (Δ);
2) 1.5 molar solution of L(+)-lysine designated with solid squares (■);
3) 1 molar solution of EDTA disodium designated with an asterisk (*);
4) 1.5 molar solution of EDTA disodium designated with solid triangles (▲); and
5) 1 molar ammonium sulfate designated with open circles (○).

Example 3

Figure 3:
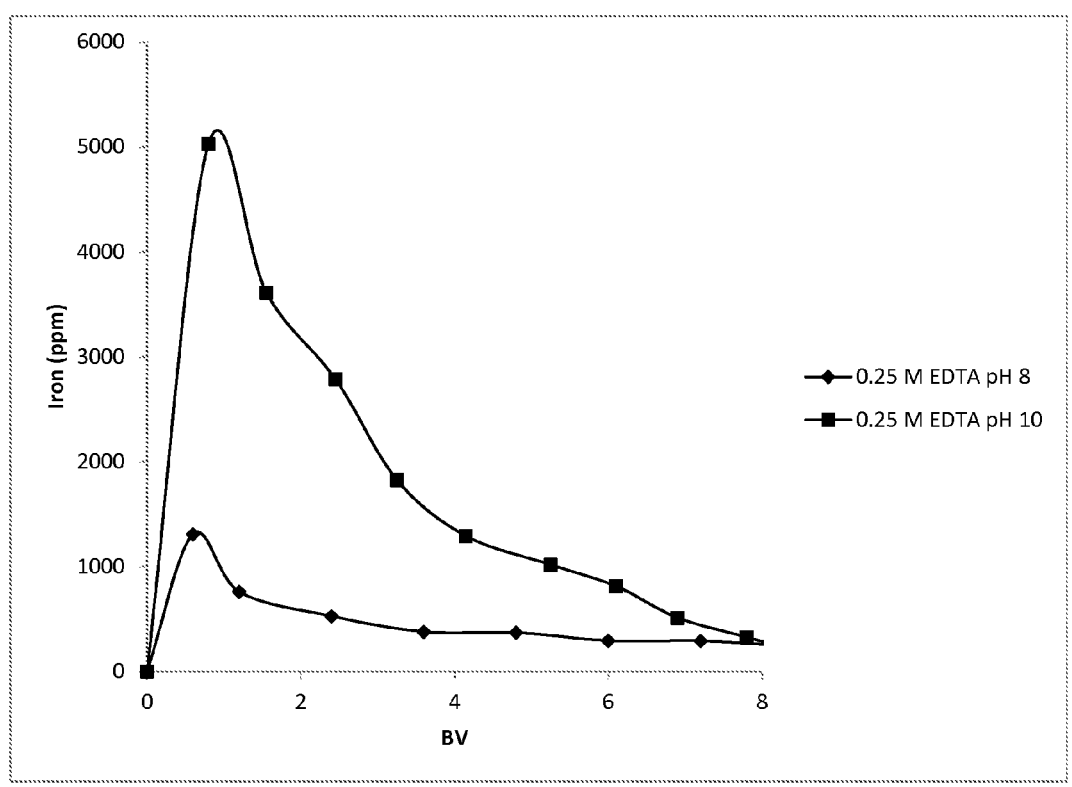
FIG. 3 is a graph of iron elution curves using a select eluant at various pH values, as further described in Example 3.

Iron Elution Testing 10 mL of AMBERLITE™ IRC747 was loaded into a 1 cm diameter jacketed glass ion exchange column. The resin was converted to the acid form with 10 bed volumes of a dilute sulfuric acid solution at pH 1. A 3 g/L solution of acidic ferric sulfate (pH 1) was passed through the column at a rate of 6 BV/h at 45° C. until the effluent iron concentration was 2.5 g/L. The iron loaded resin was then rinsed with deionized water until iron was undetected in the effluent. This iron loading procedure was repeated for all elution experiments. Representative iron elution profiles using 0.25 M EDTA at various pH values is shown in FIG. 3. The 0.25 M EDTA solution was passed through the iron loaded resin column at 6 BV/h at 45° C. All iron concentrations were measured by XRF.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

The invention claimed is:

1. A method of eluting metal ions from a bed of metal-loaded chelating resin wherein the resin comprises a crosslinked styrene-divinylbenzene copolymer matrix with pendent methyleneaminopyridine or phosphonic acid groups and the method comprises the step of passing an eluant through the bed to at least partially remove the metal ions from the chelating resin and create a metal-rich eluate, wherein the eluate comprises an aqueous solution comprising an amino acid compound having a molecular weight less than 500 Daltons.

2. The method of claim 1 wherein the amino acid compound comprising an amino acid functional group represented by Formula (I):

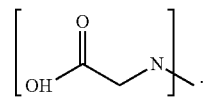

3. The method of claim 1 wherein the amino acid compound is represented by Formula (II):

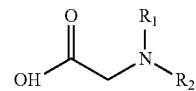

wherein $R_1$ and $R_2$ are independently selected from: hydrogen and an alkyl group having from 1 to 6 carbon atoms which may be unsubstituted or substituted with at least one of: amine, amino acid, carboxylic acid, hydroxyl, thiol and a ring structure, or $R_1$ and $R_2$ may collectively form a ring structure.

4. The method of claim 1 wherein the amino acid compound is selected from at least one of: iminodiacetic acid and ethylenediaminetetraacetic acid.

5. The method of claim 1 wherein the amino acid compound is selected from at least one of: alanine, arginine, asparagine, aspartic acid, cysteine, glutamic acid, glutamine, glycine, histidine, isoleucine, leucine, lysine, methionine, ornithine, phenylalanine, proline, selenocysteine, serine, taurine, threonine, tryptophan, tyrosine and valine.

6. The method of claim 1 wherein the eluant excludes ammonia and mineral acids.

7. The method of claim 1 wherein the metal ions comprise copper ions.

8. The method of claim 1 wherein the metal ions comprise iron ions.

9. The method of claim 1 further comprising the steps of: (a) passing a product liquor solution which contains metal ions through the bed of resin which is selective for loading the metal ions, (b) passing the eluant through the bed to at least partially remove the metal ions from the chelating resin and create a metal-rich eluate, and (c) electro-winning the metal-rich eluate to produce electro-won metal and a metal-depleted eluate, and (d) combing at least a portion of the metal-depleted eluate with the product liquid solution and repeating steps (a), (b) and (c).

\* \* \* \* \*